March 28, 1967 G. CSURGAY 3,311,765
DOUBLE WOUND PERMANENT MAGNETIC FIELD MOTOR
Filed Oct. 9, 1964 3 Sheets-Sheet 1
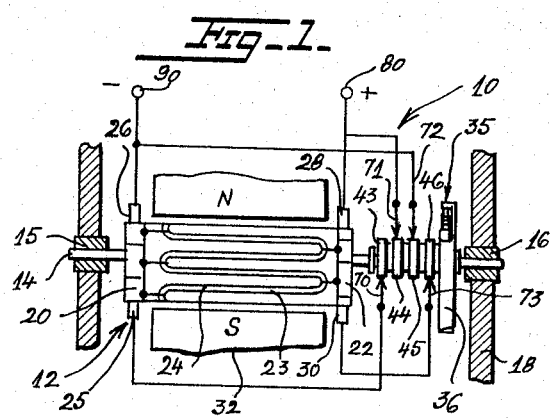
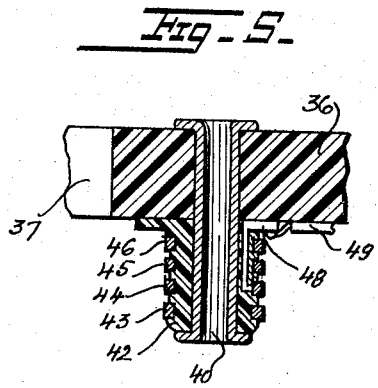
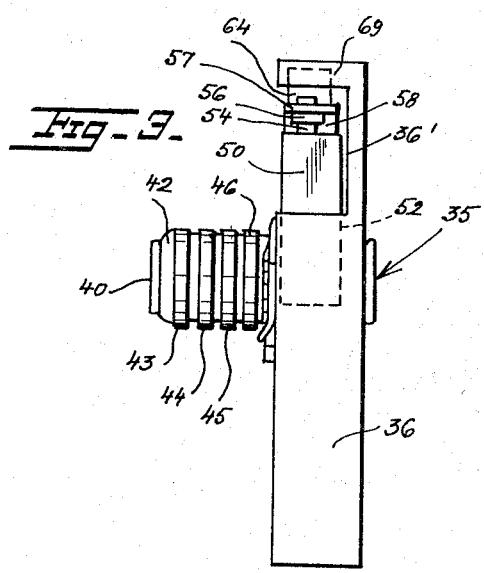
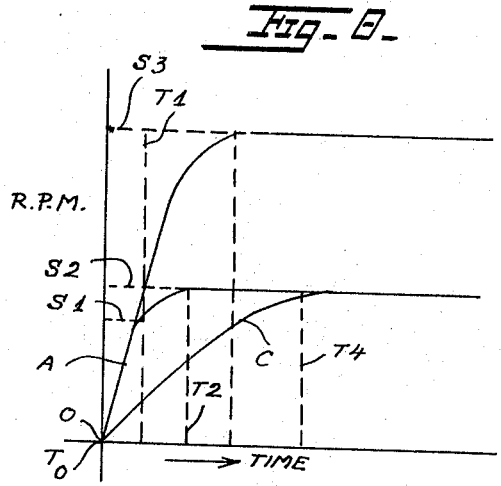
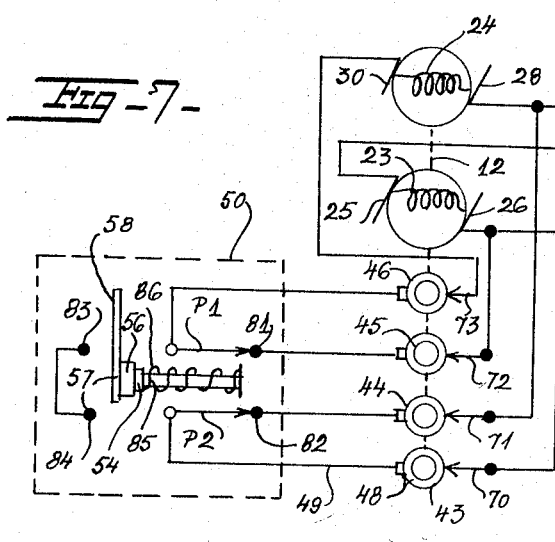
INVENTOR.
Gregory Csurgay
BY
Polachek & Saulsbury
ATTORNEYS.

March 28, 1967 G. CSURGAY 3,311,765
DOUBLE WOUND PERMANENT MAGNETIC FIELD MOTOR
Filed Oct. 9, 1964 3 Sheets-Sheet 2
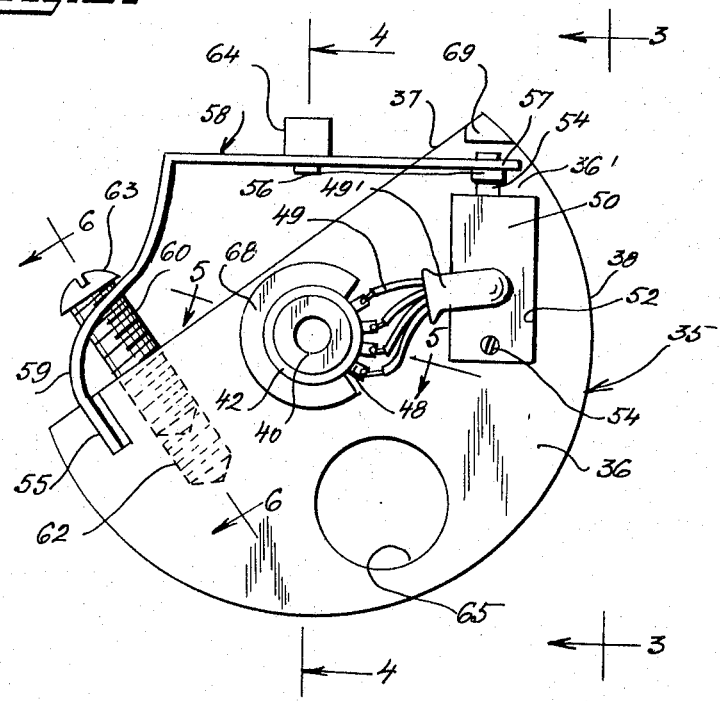
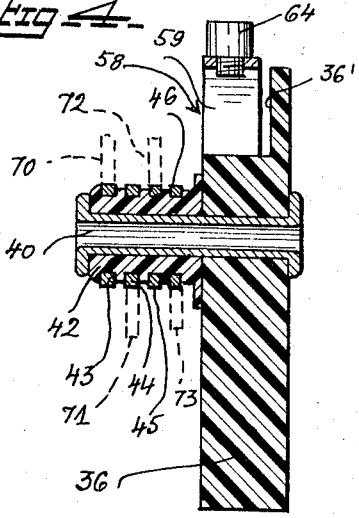
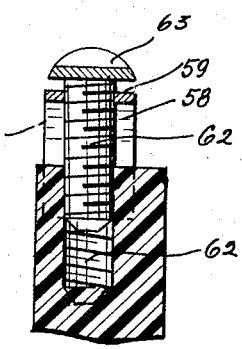
INVENTOR.
Gregory Csurgay
BY
Polachek & Saulsbury
ATTORNEYS.

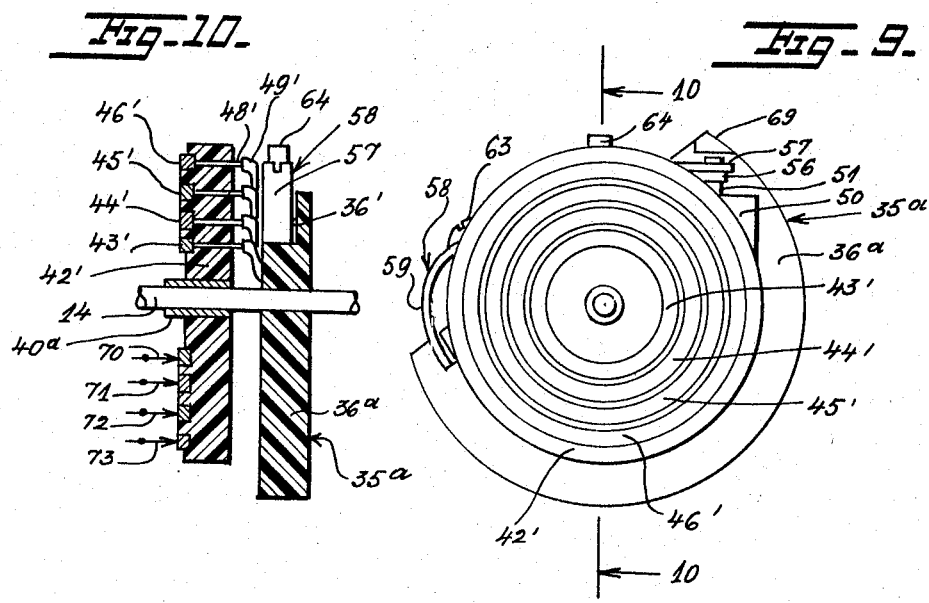
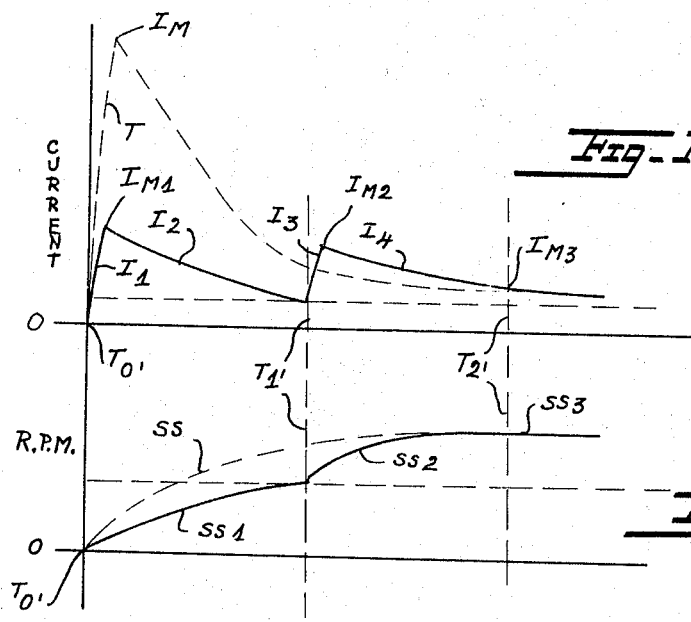

United States Patent Office 3,311,765
Patented Mar. 28, 1967

3,311,765
DOUBLE WOUND PERMANENT MAGNETIC FIELD MOTOR
Gregory Csurgay, Fort Lauderdale, Fla., assignor, by mesne assignments, to MSL Industries, Inc.,/Motor Group, Racine, Wis.
Filed Oct. 9, 1964, Ser. No. 402,859
10 Claims. (Cl. 310—68)

This invention relates to the art of direct current motors, and more particularly concerns small direct current motors of the type used in electrical appliances, phonograph drives, camera drives, space vehicles, and the like.

It is particularly important in motors of this type that after being started they come up to operatnig speed as quickly as possible. It is further important that they consume no more power than absolutely necessary due to the limited amount of energy available in the batteries generally used for such motors. Motors of this type generally employ permanent magnets as pole pieces.

According to the invention, there is provided a direct current motor having an armature rotor including two coils wound on poles of a coil form. The turns of respective coils are connected to separate commutators on which ride two separate pairs of brushes connected to power supply terminals. In circuit with the brushes and two coils is a multiple-pole double-throw switch forming part of a centrifugal governor and switch assembly mounted on the motor shaft. In one position of the governor and switch assembly when the motor is at rest and just starting, the armature coils are connected in parallel across the power supply. They start with maximum acceleration and come up to operating speed in the shortest possible time. As the armature rotor approaches or reaches operating speed, the switch is automatically operated so that the two armature coils are then connected in series to the power supply. As a result the rotor continues to rotate at constant operating speed drawing normal current. By this parallel-to-series conversion, the rotor accelerates at a faster rate initially than it would if the armature coils were permanently connected in series, and the rotor stabilizes at a lower running speed and therefore lower power consumption than it would if the armature coils were permanently connected in parallel. The invention thus solves the problem of bringing a small direct current motor up to operating speed with maximum acceleration in the shortest possible time, and then keeping the motor at constant operating speed with minimum power consumption thereafter.

It is also possible to arrange the switch connections so that the coils wound on the armature are connected in series when the armature is stationary. The coils remain connected in series until the armature reaches a certain speed when the centrifugal governor and switch assembly connects the coils in parallel. This arrangement may be employed when starting is required under a heavy load and it is desired to limit the armature current. The motor will start at low acceleration and the speed will increase slowly up to a certain speed while the armature coils are in series. Then the coils will be switched into a parallel arrangement and the armature will accelerate again up to a higher speed with only a relatively small increase in armature current.

A principal object of the invention is therefore to provide a direct current motor having parallel wound coils, with a centrifugally operated switch for converting the coils from a parallel connection across a power supply to a series connection across the power supply, at a predetermined operating speed of the motor.

Another object is to provide a novel contrifugal governor and switch assembly for changing the connections of armature coils in a direct current motor.

A further object is to provide a novel direct current motor having two armature coils or windings with means for automatically changing the coils from parallel to series connections and vice versa.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a diagrammatic showing of a motor embodying the invention.

FIG. 2 is an enlarged side view of a centrifugal governor and switch assembly according to the invention.

FIG. 3 is an edgewise elevational view of the assembly taken on line 3—3 of FIG. 2.

FIG. 4 is a vertical sectional view taken on line 4—4 of FIG. 2.

FIGS. 5 and 6 are fragmentary sectional views taken on lines 5—5 and 6—6 of FIG. 2.

FIG. 7 is a diagram of the electric circuit of the motor.

FIG. 8 is a graphic diagram used in explaining the mode of operation of the invention.

FIG. 9 is a side view of another governor and switch assembly.

FIG. 10 is a sectional view taken on line 10—10 of FIG. 9.

FIG. 11A and 11B are graphic diagrams used in explaining another mode of operation of the invention.

Referring first to FIG. 1, there is shown direct current motor 10 having an armature rotor 12 with an axial shaft 14 rotatably carried by bearings 15, 16 at opposite end of a motor casing 18. Commutators 20, 22 are provided at opposite ends of the armature 12. This armature may have two, four, eight or more poles on which are wound in parallel, side-by-side relationship two coils or windings 23, 24. Turns of coil 23 are connected to bars of commutator 20 and turns of coil 24 are connected to bars of commutator 22. One pair of stationary brushes 25, 26 contact diametrically opposite points of commutator 20 and another pair of stationary brushes 28, 30 contact diametrically opposite points of commutator 22. The motor has two, four, or more poles N, S of a permanent magnet structure 32 which provides a permanent magnetic field in which the armature rotates. Mounted on the shaft 12 is a centrifugal governor and switch assembly 35 shown to best advantage in FIGS. 2–6 to which reference is now made.

Assembly 35 includes a massive plate 36 made of metal or plastic material. The plate is a segment of a circle with a straight chordal edge 37 and an arcuate periphery 38 extending somewhat more than 180°. Axially secured to the plate 36 by a sleeve or hollow rivet 40 is an axial bushing 42. The sleeve 40 can be force fitted or otherwise secured to the shaft 14 of the rotor 12.

Bushing 42 is preferably made of insulation material and has a plurality of slip rings 43–46 axially spaced along the bushing. Each of the rings has a lug 48 integral with and extending radially out of the bushing; see FIGS. 2 and 5. Connected to the lugs are wires 49 which terminate in a cable 49' entering the body of switch 50. The switch has a rectangular structure and is seated in a recess 52 formed in the plate 36. A screw or rivet 54 holds the switch in recess 52. A triangular portion 36' is thinner and recessed with respect to the remainder of the plate. The operating end of the switch extends alongside of plate portion 36. This end of the switch has an operating button or knob 54 which is contacted and partially depressed by a contact member 56 carried at the free end 57 of a leaf spring 58. The other end 59 of the spring is bent and seated in a notch 55 formed in edge 37 of plate 36. A screw 60 is seated in a threaded bore 62 in the plate. This screw has its shank threadedly engaged in a hole 61 in the spring; see FIG. 6. The head 63 of the screw is exposed beyond the spring for adjusting tension in the spring and positioning it so that the free end 57 of the spring bears on switch button 54 with proper pressure. A cylindrical weight 64 is secured on the spring at an intermediate point on the straight portion of the spring.

A large hole 65 is provided in plate 36 to balance the plate at its center of rotation. A hole 66 is provided at this center of rotation through which sleeve 40 extends. A projection 69 at one corner of plate section 36′ limits outer movement of spring end 57.

An annular arcuate flange 68 is provided at the base of bushing 42 abutting the plate to stabilize the bushing. Suitable stationary wiper contact members or brushes 70–73 may be provided for contacting the several rings 43–46 respectively as the armature rotor 12 rotates; see FIGS. 1, 4.

FIG. 7 shows the circuit arrangement of the motor. Switch 50 is a known type of microswitch which has two poles P1, P2 operated by an arm 85 biased to a central position by spring 86. The switch has two pairs of fixed contacts 81, 82 and 83, 84 at two switch positions. The poles can close with either pair of contacts. Poles P1, P2 are connected to rings 46, 43. Contacts 81, 82 are connected to rings 45, 44. Contacts 83, 84 are connected together. Contact members or wipers 70–73 are connected to brushes 25, 28, 26, 30 respectively. The positive and negative terminals 88, 90 of the motor power supply are connected to brushes 28, 26. Battery 95 is connected to terminals 88, 90 via a manually operable switch 96.

It will be noted that the armature coils or windings 23, 24 are connected in parallel with the power supply terminals 88, 90 when poles P1, P2 are closed with contacts 81, 82. This is the normal circuit arrangement when the rotor 12 is stationary or at rest. When switch 96 is closed, full battery voltage is applied to both armature coils or windings and the motor accelerates rapidly from zero speed at time T to speed S1 at time T1 as indicated on curve A in FIG. 8.

When the motor reaches speed S1 the centrifugal arm defined by spring end 57 and weight 64 moves outwardly away from the button 54. Spring 86 then expands and arm 85 then throws poles P1, P2 to the second position closing with contacts 83, 84. This connects the armature coils 23, 24 in series and acceleration of the rotor slows down and then ceases. The rotor then continues at constant speed S2 at time T2 shortly after time T1 as indicated by curve A′.

When the rotor reaches constant speed, the spring end 57 is restored to its normal position shown in FIG. 2. The switch 50 is not operated again. To operate the switch and restore poles P1, P2 to contacts 81, 82 it is necessary to push the button 54 inwardly of the switch. This is done when switch 96 is open. The power to the motor is cut off. The motor stops and as it slows down, the spring end 57 moves centrifugally radially inwardly of the plate 36 to depress the button 54 momentarily. This is sufficient for switch arm 85 to throw poles P1, P2 to contacts 81, 82 as the spring 86 momentarily contracts. As the rotor 12 stops, the spring end 57 again assumes its normal position of FIG. 2 with the poles P1, P2 closed with contacts 81, 82. The switch then awaits outward movement of the spring end 57 and button 54 for again closing poles P1, P2 with contacts 83, 84 and next time the motor is started.

Curve B in FIG. 8 shows the acceleration effect which would occur if armature coils 23, 24 were to remain in parallel with each other with switch 50 remaining in the position of FIG. 7. The speed of the rotor would continue to increase for a longer time up to time T3 when the speed would stabilize at a higher speed S3 with greater consumption of power, because both coils would be connected across the full voltage of the power supply. Curve C in FIG. 8 shows the acceleration effect which would occur if switch 50 were to remain in its second position with poles P1, P2 closed with contacts 83, 84. The rotor would accelerate much more slowly and would not attain full speed S2 until later time T4. This would be most undesirable since what is most wanted is that the motor come up to speed S2 in the shortest possible time. The present invention thus accomplishes its primary purpose effectively, automatically with optimum economy of power consumption. The objects of the invention are accomplished by a relatively simple rugged mechanical structure which is durable and long lasting.

FIGS. 9 and 10 illustrate another governor and switch assembly 35a in which the axially spaced rings 43–46 and assembly 35 are replaced by concentric coplanar rings 43′–46′ embedded in a circular plate 42′ made of insulation material. This plate has a bushing 42a engaged on the motor shaft 14. Conductive pins 48′ are connected to the respective rings and pass axially through the plate 42′. Wires 49′ are connected to switch 50 carried by the governor plate 36a. Other parts of the assembly are identical to those of the assembly 35 and corresponding parts are identically numbered. The assembly 35a may be used in place of assembly 35 when a more compact axially shorter construction is desired. Also the arrangement of assembly 35a permits the governor and switch on plate 35a to be mounted outside of the motor casing on shaft 14. The same circuit connections as shown in FIG. 7 will be employed in the assembly 35a. Wipers or brushes 70–73 make continuous contact with rings 43′–46′ and are connected to brushes 25, 28, 26, 30 respectively.

As previously mentioned, it is possible to employ the invention in a way in which the coils 23, 24 will initially be connected in series and then will be switched to parallel connection. This is accomplished if poles P1, P2 of switch 50 are in FIG. 7 positioned in contact with contacts 83, 84 when the assembly 35 or 35a is stationary or rotating at low speed. Then when the speed of the armature rotor increases to a predetermined speed, the switch will be thrown to close poles P1, P2 with contacts 81, 82, whereupon coils 23, 24 will be connected in parallel.

FIGS. 11A, 11B illustrate graphically of this mode of operation, which will be used if the motor is required to start with a heavy load and the current drawn by the coils is to be kept to a minimum. The solid line curve in FIG. 11A indicates the current $I_1$ which rises rapidly when switch 96 is closed. It rises to a maximum $I_{M1}$ limited by the series connected coils 23, 24. Then as the motor armature begins to rotate and generate a back electromotive force, the current $I_2$ drops gradually to a lower value until time $T1'$. Then the switch poles P1, P2 change position to connect the coils in parallel, whereupon the current $I_3$ rises rapidly to a $I_{M2}$ whereupon current $I_4$ decreases gradually to a stable magnitude $I_{M3}$. It will be noted that at all times the current maximum remains less than current $I_M$ which is the maximum to which the current I would rise if the coils 23, 24 remained in parallel from the beginning rather than starting in series and switching to parallel.

FIG. 11B shows in dotted line curve SS how the armature speed would increase rather rapidly from time $T0'$, while the current I increased excessively if the coils 23, 24 remained in parallel at all times. The solid line curve $SS1$ shows the speed of the armature increasing slower under load at the start than since the coils 23, 24 are connected in series. Then at time $T1'$ the coil connection changes to parallel whereupon the speed $SS2$ again increases and finally stabilizes at speed $S_M$ at time $T2'$.

The series to parallel switching accomplished by the centrifugal governor and switch assembly 35 or 35a, thus makes it possible to bring a motor armature up to a desired speed under a heavy load while keeping the current drawn down to a predetermined magnitude.

It has previously been mentioned that the coils 23, 24 are wound parallel to each other in side-by-side relationship. For certain applications the coils may be wound in parallel relationship but one wire surrounding the other turn after turn. Alternatively one wire coil can be completely wound on the armature and then the other coil can be wound on top of the first coil. The two coils may have two different gauge wires and may have different numbers of turns.

Various details of construction may be changed such as use of two, four or more permanent magnet poles to provide the magnetic field; and use of two, four or more armature poles. Alternate ways may be devised for conducting current to the poles and contacts of the centrifugal governor and switch assembly. Ceramic magnets may be used as the field poles.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a multiple pole-double throw switch having poles and contacts electrically connected in circuit with the brushes, and governor means for throwing the switch from a first operating position when the rotary armature is stationary and when the rotary armature is rotating at less than a predetermined speed to a second operating position when the rotary armature is rotating at a higher speed than predetermined speed, said coils being connected in parallel when the switch is in one of the operating positions thereof and being connected in series when the switch is in the other operating position thereof.

2. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a multiple pole-double throw switch having poles and contacts electrically connected in circuit with the brushes, and governor means for actuating the switch so that the coils are connected electrically in parallel to the power supply terminals in one position of the poles when the rotary armature is stationary and when the rotary armature is rotating at less than a predetermined speed, and so that the coils are connected in series to the power supply terminals when the rotary armature is rotating at a speed higher than said predetermined speed.

3. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a double pole-double throw switch having poles and contacts electrically connected in circuit with the brushes, and governor means for actuating the switch so that the coils are connected electrically in parallel to the power supply terminals in one position of the poles when the rotary armature is stationary and when the rotary armature is rotating a less than predetermined speed and so that the coils are connected in series to the power supply terminals when the rotary armature is rotating at a speed higher than said predetermined speed, said governor means including a plate on said shaft supporting said switch, a spring having one end engaged on said plate, adjustable screw means holding said one end of the spring, said switch having a movable operating member, said spring having a free other end contacting said operating member, and a weight on the free end of the spring, whereby the free end of the spring moves outwardly while the rotary armature is accelerating from a rest position to permit the operating member of the switch to move outwardly and throw the poles from one contact position to another, and whereby the free end of the spring moves inwardly while the rotary armature is decelerating to move said operating member inwardly and throw the switch poles from said other contact position to said one position.

4. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a multiple pole-double throw switch having poles and contacts electrically connected in circuit with the brushes, and governor means for throwing the switch from a first operating position when the rotary armature is stationary and when the rotary armature is rotating at less than a predetermined speed to a second operating position when the rotary armature is rotating at a higher speed than predetermined speed, said coils being connected in parallel when the switch is in one of the operating positions thereof and being connected in series when the switch is in the other operating position thereof, said governor means including a plate on said shaft supporting said switch, a spring having one end engaged on said plate, adjustable screw means holding said one end of the spring, said switch having a movable operating member, said spring having a free other end contacting said operating member, and a weight on the free end of the spring, whereby the free end of the spring moves outwardly while the rotary armature is accelerating from a rest position to permit the operating member of the switch to move outwardly and throw the poles from one contact position to another, and whereby the free end of the spring moves inwardly while the rotary armature is decelerating to move said operating member inwardly and throw the switch poles from said other contact position to said one position.

5. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a multiple pole-double throw switch having poles and contacts electrically connected in circuit with the brushes, and governor means for actuating the switch so that the coils are connected electrically in parallel to the power supply terminals in one position of the poles when the rotary armature is stationary and when the rotary armature is rotating a less than a predetermined speed, and so that the coils are connected in series to the power supply terminals when the rotary armature is rotating at a speed higher than said predetermined speed, the coils of said armature being wound on a coil form having at least two poles.

6. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a multiple pole-double throw switch having poles and contacts electrically connected in circuit with the brushes, and governor means for throwing the switch from a first operating position when the rotary armature is stationary and when the rotary armature is rotating at less than a predetermined speed to a second operating position when the rotary armature is rotating at a higher speed than predetermined speed, said coils being connected in parallel when the switch is in one of the operating positions thereof and being connected in series when the switch is in the other operating position thereof, said assembly including an insulated support carrying four conductive slip rings, said switch having two pairs of contacts, the contacts of one of said pairs of contacts being connected together, the contacts of the other pair of contacts being connected to a first two of the slip rings respectively, the two poles being connected to the other two slip rings respectively, four stationary wiper contacts respectively contacting the first two slip rings being connected to the brushes which are connected to the power supply terminals, the other two wiper contacts being connected to the other brush in each pair of brushes respectively.

7. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a multiple pole-double throw switch having poles and contacts electrically connected in circuit with the brushes, and governor means for throwing the switch from a first operating position when the rotary armature is stationary and when the rotary armature is rotating at less than a predetermined speed to a second operating position when the rotary armature is rotating at a higher speed than predetermined speed, said coils being connected in parallel when the switch is in one of the operating positions thereof and being connected in series when the switch is in the other operating position thereof, said assembly including an insulated plate carrying four slip rings in a coplanar concentric arrangement, said switch having two pairs of contacts, the contacts of one of said pairs of contacts being connected together, the contacts of the other pair of contacts being connected to a first two of the slip rings respectively, the two poles being connected to the other two slip rings respectively, four stationary wiper contacts respectively contacting the first two slip rings being connected to the brushes which are connected to the power supply terminals, the other two wiper contacts being connected to the other brush in each pair of brushes respectively.

8. A rotor for a direct current motor, comprising a coil form, a shaft extending axially of said coil form for rotatably supporting the same, a pair of coils wound on said shaft, turns of the coils being connected to bars on different ones of the commutators, and a centrifugal governor and switch assembly mounted on said shaft and rotatable therewith, said assembly including a multiple-pole double throw switch and centrifugally actuated governor to operate the switch, said switch having poles and fixed contacts, and circuit means for electrically connecting said poles and contacts in circuit with the coils so that when said assembly is stationary and when said assembly is rotating at less than a predetermined speed, the coils are connected in parallel circuit with each other through said poles and a first two of said contacts, and so that when said assembly is rotating at a speed higher than said predetermined speed the coils are connected via said poles and two others of said contacts in series with each other, said circuit means including an insulated support mounted on said shaft to rotate therewith, four spaced conductive slip rings on said support, the two poles being connected to two of said slip rings respectively, the first two contacts being connected to the other two slip rings respectively, the other two contacts being connected to each other, a plate carried by said shaft, said switch being supported by said plate, said governor including a leaf spring having one end engaged in a notch in an edge of the plate, said switch having a movable operating member, said spring having a centrifugally movable free other end contacting said operating member, and a weight on the other end of the spring, whereby the free end of the spring moves centrifugally outward while said assembly is accelerating from a rest position to permit the operating member to move outwardly and throw the poles from one contact position to another contact position, and whereby the free end of the spring moves centrifugally inwardly while the said assembly is decelerating to move said operating member inwardly and throw the poles from said other contact position to the one contact position, said commutators being located at opposite ends of the coil form, the coils having turns disposed parallel to each other turn after turn with an equal length of wire of the same size in each turn, so that both coils draw equal power when they are connected in parallel and when they are connected in series.

9. A direct current motor, comprising a casing, a permanent magnet structure in said casing having a plurality of magnetic poles maintaining a permanent magnetic field in said casing, a rotary armature having a shaft rotatably journaled in said casing, said armature having a pair of coils and a pair of commutators, turns of each coil being connected to different ones of the commutators, a first pair of brushes contacting one of the commutators, a second pair of brushes contacting the other of the commutators, circuit means for connecting one brush of each pair of brushes to a different external power supply terminal, and a centrifugal governor and switch assembly mounted on said shaft and rotatable therewith; said assembly including a double pole-double throw switch having poles and contacts electrically connected in circuit with the brushes, and governor means for actuating the switch so that the coils are connected electrically in parallel to the power supply terminals in one position of the poles when the rotary armature is stationary and when the rotary armature is rotating a less than a predetermined speed, and so that the coils are connected in series to the power supply terminals when the rotary armature is rotating at a speed higher than said predetermined speed, said assembly including an insulated bushing coaxial with said shaft and rotating therewith, four conductive slip rings axially spaced along said bushing, said switch having two pairs of contacts, the contacts of one of said pairs of contacts being connected together, the contacts of the other pair of contacts being connected to a first two of the slip rings respectively, the two poles being connected to the other two slip rings respectively, four stationary wiper contacts respectively contacting the slip rings, the two wiper contacts contacting the first two slip rings being connected to the brushes which are connected to the power supply terminals, the other two wiper contacts contacting the other two slip rings being connected to the other brush in each pair of brushes respectively, said armature including a coil form with at least two poles, the coils being wound on the coil form with turns disposed parallel to each other turn after turn with an equal length of wire of the same size in each turn, so that both coils draw equal power when they are connected in parallel and when they are connected in series.

10. A rotor for a direct current motor, comprising a coil form, a shaft extending axially of said coil form for rotatably supporting the same, a pair of coils wound on said coil form, two commutators on said shaft, turns of the coils being connected to bars on different ones of the commutators, and a centrifugal governor and switch assembly mounted on said shaft and rotatable therewith, said assembly including a multiple-pole double throw switch and a centrifugally actuated governor to operate the switch, said switch having poles and fixed contacts, and circuit means for electrically connecting said poles and contacts in circuit with the coils so that when said assembly is stationary and when said assembly is rotating at less than a predetermined speed, the coils are connected in series circuit with each other through said poles and a first two of said contacts, and so that when said assembly is rotating at a speed higher than said predetermined speed the coils are connected via said poles and two others of said contacts in parallel with each other.

References Cited by the Examiner
UNITED STATES PATENTS

| | | | |
|---|---|---|---|
| 404,668 | 6/1889 | Hunter | 318—497 |
| 623,989 | 5/1899 | Corse | 310—200 |
| 913,691 | 3/1909 | Burke | 318—340 |
| 2,814,770 | 11/1957 | Tourtellot | 310—68 |
| 3,058,045 | 10/1962 | Feindt | 310—68 |

MILTON O. HIRSHFIELD, *Primary Examiner.*

J. D. MILLER, *Assistant Examiner.*